No. 684,700. Patented Oct. 15, 1901.
R. McA. LLOYD.
STORAGE BATTERY.
(Application filed Feb. 15, 1901.)
(No Model.)
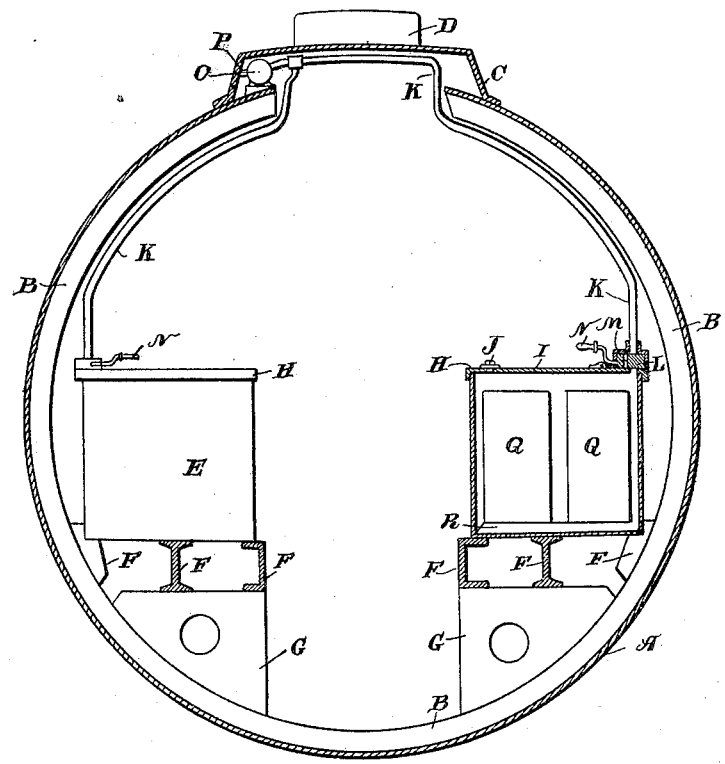
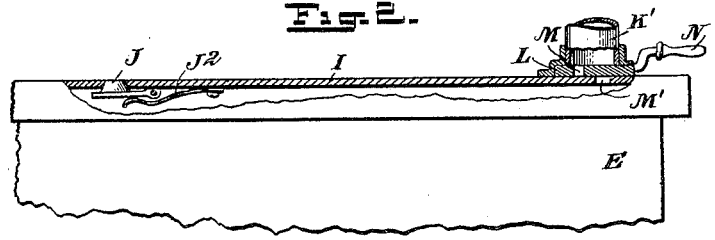
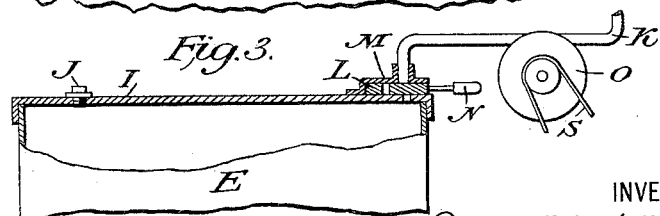
WITNESSES:
INVENTOR
Robert McA. Lloyd,
BY
Betts Betts Sheffield Betts
ATTORNEYS.
THE NORRIS PETERS CO., PHOTO-LITHO., WASHINGTON, D. C.

UNITED STATES PATENT OFFICE.

ROBERT McA. LLOYD, OF NEW YORK, N. Y., ASSIGNOR TO THE ELECTRIC BOAT COMPANY, OF NEW YORK, N. Y., A CORPORATION OF NEW JERSEY.

STORAGE BATTERY.

SPECIFICATION forming part of Letters Patent No. 684,700, registered October 15, 1901.

Application filed February 15, 1901. Serial No. 47,404. (No model.)

*To all whom it may concern:*

Be it known that I, ROBERT MCA. LLOYD, a citizen of the United States, residing in the borough of Manhattan, in the city and State of New York, (with a post-office address at 100 Broadway, in said borough of Manhattan,) have invented certain new and useful Improvements in Storage Batteries and Ventilation Thereof, of which the following is a full and true description, reference being had to the accompanying drawings, showing one embodiment of my invention.

Similar letters indicate like parts in the several views.

The object of my invention is to combine with a storage battery, especially for boat and vehicle propulsion, means for ventilating the battery and carrying off gases generated in or released by the battery solution. During the charging of a storage battery with current the gases evolved rise in the battery solution as bubbles and upon breaking create a fine spray containing acid in suspension, and it becomes important to remove the fumes from the battery or battery-compartment at once. In the case of an electrically-propelled or electrically-lighted boat, and more especially a submarine boat of the Holland or other type, it is of vital importance that gases or fumes generated or released during charging of the batteries or during their use shall be exhausted as soon as possible. The gases or fumes are likely to escape from the battery-cell or battery-compartment and to suffocate the crew, and the fumes (a fine spray containing dilute sulfuric acid in suspension) are very penetrating and enter into the machinery of the boat and into parts of its hull, causing corrosion and destruction of the metallic parts and leaks in the hull. The presence of the fumes and gases in the hull of the boat is believed to be the reason for the failure of submarine boats recently experimented with in France to properly operate. Aside from their corrosive action the gases and fumes are readily inflammable and highly explosive, and if allowed to remain in the battery or in the boat's hull there is a grave liability that any arcing, sparking, or undue heating within the battery or contact with lighting or heating apparatus or defectively-insulated wires within the hull may cause explosion of the gases and destruction of the boat. It has also been found that where the fumes are permitted to remain in the compartment the spray ultimately precipitates upon the conductors, plates, battery-boxes, and walls of the compartment, and the current through the batteries is short-circuited, with consequent arcing and sparking.

The combination of parts devised by me overcomes the difficulty mentioned.

Referring to the accompanying drawings, Figure 1 is a cross-sectional view of a submarine boat, showing my improvements combined with two sets of storage batteries for propelling the boat. Fig. 2 is an enlarged detail view of the valves at a battery-compartment, and Fig. 3 is a detail view showing a power-driven exhaust-fan or a suction-blower for exhausting gases from the battery-compartment.

A indicates the hull of the boat, and B indicates the internal ribs or braces.

C indicates the dome of the boat, and D the observation-tower.

E E indicate storage batteries or compartments containing such batteries. They may be made in accordance with the description of my pending application, Serial No. 47,403, filed simultaneously herewith, and may be insulated from the boat or its machinery as therein described. In the accompanying drawings they are shown supported by beams and braces F and G. Each compartment may have any suitable cover, as H, preferably provided with a hinged door I, permitting ready access to the compartment. The cover or the door or other part of the compartment may be provided with a port for the admission of air during the exhausting of gases or charging of the batteries, and this port will be closed by a plug or valve J. The form shown in Fig. 1 is an ordinary form of screw-plug to be operated by hand or with a tool; but an automatic valve (such as the tapered valve J of Fig. 2, elastically held to its seat by a flat spring J' and only permitting ingress of air) may be employed.

K indicates a pipe or other open connection leading from the battery-compartment E, a valve L being interposed between the opening of the compartment and the pipe. The form or location of said valve L may be varied to suit the requirements; but I prefer to employ a flat valve having a port or passage M therethrough and so related with respect of the opening from the compartment that in one position the port M of the valve will register with the pipe and with the opening from the compartment and in another position the valve will close the gas-exit from E. The valve L may be operated by a handle N, preferably of insulating material or insulated from the metallic parts of the apparatus. The pipes K lead (see Fig. 2) to a casing O, (preferably, for convenience, situated within the dome C,) containing or leading to an exhausting device, as a suction blower or pump, (see Fig. 3, in which a belt S from a motor is shown for driving a suitable blower within the casing O,) for drawing gases or fumes from the batteries or battery-compartments and discharging the same through a pipe either outside of the boat or into a storage-tank. The batteries Q may be of any desired construction. A form of battery-cell found useful by me is described and shown in an application filed by me November 27, 1900, (Serial No. 37,870,) for patent for storage batteries.

While I have herein shown and described preferred embodiments of my invention, yet I do not desire to be understood as confining myself to the illustrated combinations, as obviously modifications will readily suggest themselves to skilled persons and still be within my invention.

What I claim is—

1. In combination with a battery-compartment, a pipe in open connection with the compartment for leading gases therefrom, a valve for closing said pipe, and means for causing suction through the pipe, and thereby drawing off the gases; substantially as and for the purpose described.

2. In combination with a battery-compartment, a pipe in open connection with the compartment for leading gases therefrom, and means for causing suction through the pipe and thereby drawing off the gases, substantially as and for the purpose described.

3. In combination with a battery-compartment, a pipe in open connection with the compartment for leading gases therefrom, and means for causing a circulation of air through the battery-compartment, substantially as and for the purpose described.

In witness whereof I have hereunto signed my name this 28th day of January, 1901.

ROBERT McA. LLOYD.

In presence of—
W. H. BERRIGAN, Jr.,
JAMES J. COSGROVE.